US011885686B2

(12) United States Patent
Kobayashi et al.

(10) Patent No.: US 11,885,686 B2
(45) Date of Patent: Jan. 30, 2024

(54) COLOR MEASURING SYSTEM AND PROGRAM

(71) Applicant: SEIKO EPSON CORPORATION, Tokyo (JP)

(72) Inventors: Ayako Kobayashi, Nagano (JP); Yuka Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/651,581

(22) Filed: Feb. 18, 2022

(65) Prior Publication Data

US 2022/0268631 A1 Aug. 25, 2022

(30) Foreign Application Priority Data

Feb. 22, 2021 (JP) ................................. 2021-026090

(51) Int. Cl.
*G01J 3/50* (2006.01)
*G01J 3/46* (2006.01)

(52) U.S. Cl.
CPC ................ *G01J 3/50* (2013.01); *G01J 3/462* (2013.01); *G01J 2003/467* (2013.01)

(58) Field of Classification Search
CPC .... G01J 3/462; G01J 3/463; G01J 3/50; G01J 2003/467
See application file for complete search history.

(56) References Cited

U.S. PATENT DOCUMENTS

| 6,007,332 A | * | 12/1999 | O'Brien | ................ | A61C 19/10 |
| | | | | | 356/404 |
| 7,341,450 B2 | * | 3/2008 | Pye | ........................ | A61C 19/10 |
| | | | | | 356/402 |
| 11,170,532 B1 | * | 11/2021 | Thomson | ............. | H04N 1/6061 |
| 2015/0228086 A1 | * | 8/2015 | Maurer | ................... | G06T 7/001 |
| | | | | | 382/100 |

FOREIGN PATENT DOCUMENTS

| EP | 1363220 A2 | * | 11/2003 | ................ | G01J 3/46 |
| EP | 2434745 A2 | * | 3/2012 | ................ | G01J 3/52 |

OTHER PUBLICATIONS

Tom Builds Stuff, "How To Match Paint Colors Accurately", https://www.youtube.com/watch?v=4W-RDBgWoeQ, Jul. 5, 2019 (Year: 2019).*

* cited by examiner

*Primary Examiner* — Maurice C Smith

(74) *Attorney, Agent, or Firm* — Global IP Counselors, LLP

(57) ABSTRACT

A color measuring system includes a color measuring section configured to perform color measurement, a receiving section configured to receive designation of a color sample book, a selecting section configured to, in response to the color measurement being performed, compare colors of the color sample book and a color measured by the color measuring section and automatically select colors close to the measured color out of the color sample book, and a notifying section configured to notify the selected colors to a user as approximate colors of the measured color.

6 Claims, 15 Drawing Sheets

FIG. 4
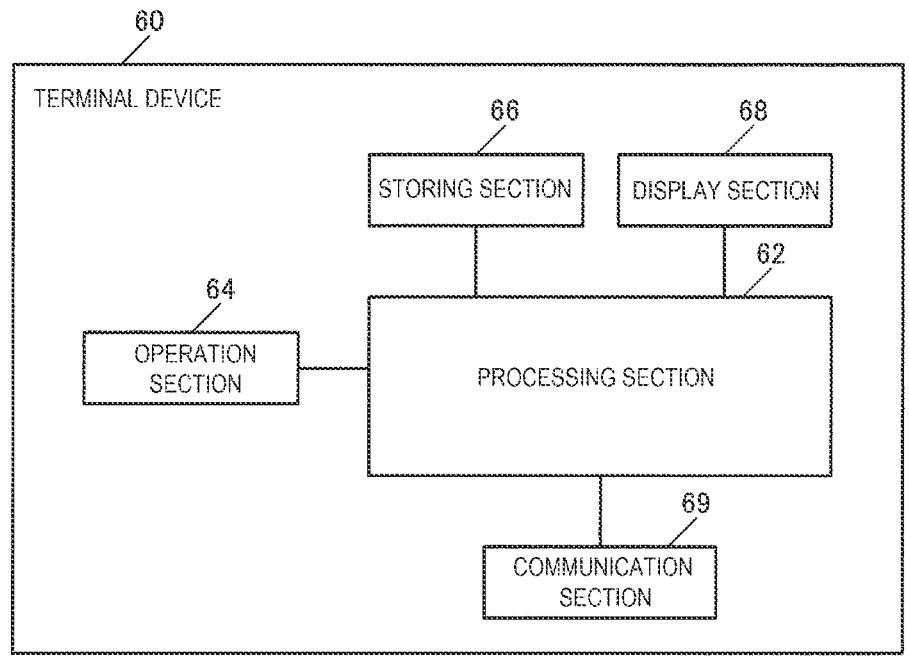
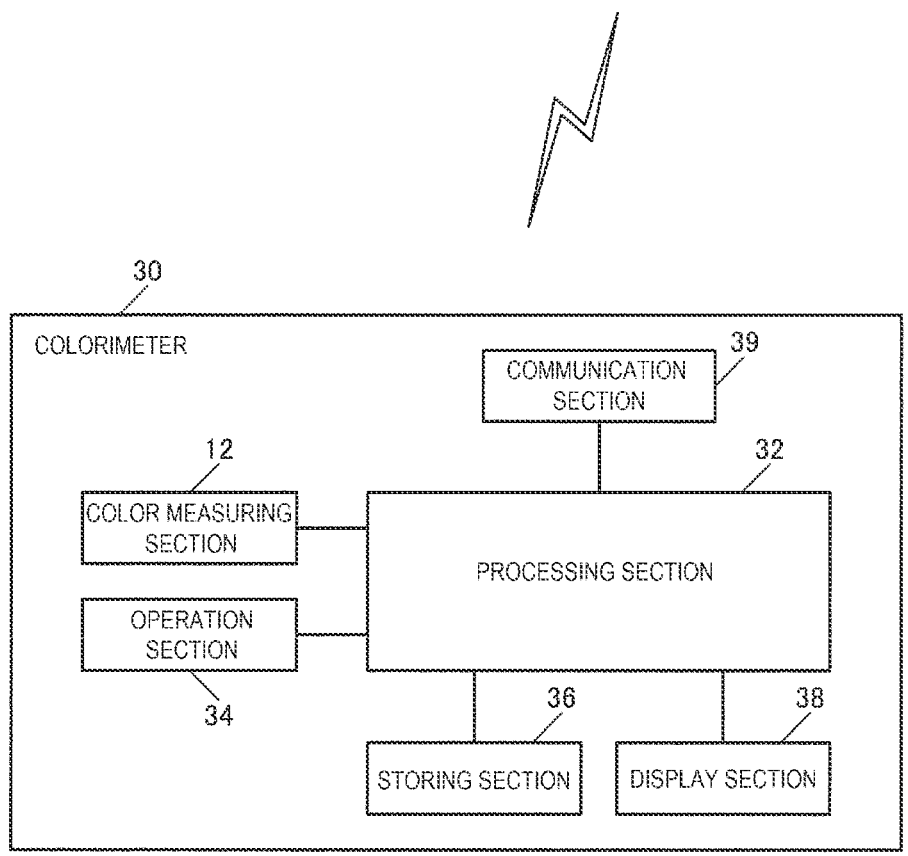

FIG. 15

| COLOR SAMPLE BOOK | |
|---|---|
| EDIT | SELECT |
| EXISTING COLOR SAMPLE BOOK | |
| PANTONE | ✓ |
| DIC COLOR | ✓ |
| COLOR FINDER | |
| TRUMATCH | |
| ⋮ | |
| CUSTOM COLOR SAMPLE BOOK | |
| CSB1 | |
| CSB2 | ✓ |
| CSB3 | |
| ⋮ | |

COLOR MEASURING SYSTEM AND PROGRAM

The present application is based on, and claims priority from JP Application Serial Number 2021-026090, filed Feb. 22, 2021, the disclosure of which is hereby incorporated by reference herein in its entirety.

BACKGROUND

1. Technical Field

The present disclosure relates to a color measuring system, a program, and the like.

2. Related Art

There has been known a color measuring system that performs color measurement for a color. As related art of such a color measuring system, there has been known, for example, a system disclosed in United States Patent Application Publication No. 2015/0228086 (Patent Literature 1). Patent Literature 1 discloses a color measuring system that calculates a color value from a captured image.

For example, in printing or the like on a printing medium, it is sometimes requested to specify a color out of a large number of colors included in a color sample book or the like.

SUMMARY

An aspect of the present disclosure relates to a color measuring system including: a color measuring section configured to perform color measurement; a receiving section configured to receive designation of a color sample book; a selecting section configured to, in response to the color measurement being performed, compare colors of the color sample book and a color measured by the color measuring section and automatically select colors close to the measured color out of the color sample book; and a notifying section configured to notify the selected colors to a user as approximate colors of the measured color.

An aspect of the present disclosure relates to a non-transitory computer-readable storage medium storing a program for causing a computer, which communicates with a color measuring section, to function as: a receiving section configured to receive designation of a color sample book; a selecting section configured to, in response to color measurement being performed by the color measuring section, compare colors of the color sample book and a color measured by the color measuring section and automatically select colors close to the measured color out of the color sample book; and a notifying section configured to notify the selected colors to a user as approximate colors of the measured color.

BRIEF DESCRIPTION OF THE DRAWINGS

FIG. 4 is a configuration example of the colorimeter and the terminal device.

FIG. 15 is an explanatory diagram about designation of a custom color sample book.

DESCRIPTION OF EXEMPLARY EMBODIMENTS

An embodiment explained below does not unduly limit content described in the claims. Not all of components explained in this embodiment are always essential constituent elements.

1. Color Measuring System

Figure 1:
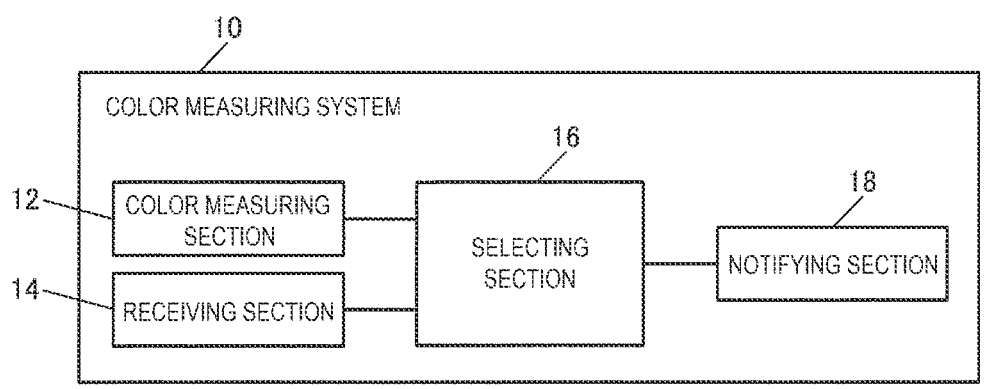
FIG. 1 is a configuration example of a color measuring system.

FIG. 1 is a diagram showing a configuration example of a color measuring system 10 in this embodiment. The color measuring system 10 includes a color measuring section 12, a receiving section 14, a selecting section 16, and a notifying section 18.

The color measuring section 12 performs color measurement. For example, the color measuring section 12 performs the color measurement for a target color, for example, printed on a printing medium and outputs a color measurement value, which is a color measurement result. The color measuring section 12 can be realized by a color measurement sensor or the like. For example, a spectral sensor can be used as the color measurement sensor. For example, a spectral sensor by MEMS (Micro Electro Mechanical Systems) capable of performing collective production in a wafer-level process can be used as the color measurement sensor. The spectral sensor is, for example, a sensor that measures a reflective spectrum. Specifically, the spectral sensor can be realized by a light source realized by an LED or the like, an optical filter that receives an input of reflected light on a measurement surface for light from the light source and performs selection and switching of a wavelength, a light receiving device that measures a light amount of the reflected light having passed through the optical filter, and the like. As the optical filter, for example, an etalon, which is a wavelength filter using multiple interference of two opposed reflection surfaces can be used. By performing, with the spectral sensor, the measurement of the reflective spectrum for measuring light amounts of the reflected light at wavelengths of the reflected light, the color measurement for the target color is realized. The color measurement sensor that realizes the color measuring section 12 is not limited to such a spectral sensor. The color measurement sensor may be realized by, for example, an image sensor. As the color measuring section 12, a color measuring section that not only measures reflected light but also measures transmitted light may be adopted.

The receiving section 14 performs processing for receiving designation of a color sample book. For example, when a user of the color measuring system 10 designates a desired color sample book out of a plurality of color sample books, the designated color sample book is registered as a color sample book used by the user. For example, user information in which the color sample book designated by the user is correlated with the user is saved and registered in the storing section of the color measuring system 10. The color sample book is electronic data indicating colors of a color sample book serving as a booklet actually present in reality. The receiving processing of the receiving section 14 can be realized by, for example, display processing for a selection screen for a color sample book and receiving processing for designation operation for the color sample book by the user on the selection screen for the color sample book.

The selecting section 16 compares, in response to the color measurement being performed, colors of the color sample book and a color measured by the color measuring section 12. For example, when the user performs the color measurement for a target color using the color measuring section 12, the selecting section 16 performs processing for comparing colors included in the color sample book designated by the receiving processing of the receiving section 14 and the color measured by the color measuring section 12. For example, the selecting section 16 compares color values of a plurality of colors included in the color sample book and a color measurement value in the color measuring section 12. The selecting section 16 performs processing for automatically selecting colors close to the measured color out of the color sample book. For example, the selecting section 16 performs processing for selecting colors having small color differences from the color measurement value out of a plurality of colors included in the color sample book. The automatically selecting processing is selection processing performed by a computer that realizes the color measuring system 10.

The notifying section 18 notifies the selected colors to the user as approximate colors of the measured color. For example, when the selecting section 16 selects colors close to the measured color out of the color sample book, the notifying section 18 performs processing for notifying the selected colors to the user as approximate colors of the measured color. The approximate colors may include the same color as the measured color. For example, the notifying section 18 notifies colors having small color differences from the color measurement value among the colors of the color sample book to the user as approximate colors of the measured color. The notification processing for the approximate colors can be realized by, for example, display processing on a display section 38 of a colorimeter or display processing on a display section 68 of a terminal device 60 shown in FIG. 2 explained below.

The selecting section 16 selects a plurality of colors out of the colors of the color sample book in order from a color closest to the measured color. The notifying section 18 arranges the selected plurality of colors in order from the color closest to the measured color and notifies the selected plurality of colors to the user. A color being close means, for example, a color difference being small. That is, the selecting section 16 compares color values of the plurality of colors of the color sample book and the color measurement value and selects a plurality of colors out of the colors of the color sample book in order from a color having the smallest color difference from the measured color. The notifying section 18 performs notification processing for arranging the selected plurality of colors in order from the color having the smallest color difference from the measured color and displaying the selected plurality of colors to the user.

The selecting section 16 selects a plurality of colors out of the colors of the color sample book in order from a color closest to the measured color. The notifying section 18 arranges the selected plurality of colors on a color space and notifies the selected plurality of colors to the user as approximate colors. For example, the notifying section 18 arranges, based on a positional relation on the color space, the plurality of colors selected out of the color sample book by the selecting section 16. For example, the notifying section 18 arranges the plurality of colors in association with positions on the color space. For example, the notifying section 18 arranges, in a region of the color space centering on the measured color, the plurality of colors selected out of the color sample book in positions corresponding to the respective colors and arranges axes of the color space as well. The notifying section 18 performs notification processing for displaying the plurality of colors arranged in the region on the color space in this way to enable the user to visually recognize the plurality of colors.

The selecting section 16 selects a plurality of colors out of the colors of the color sample book in order from a color closest to the measured color. The notifying section 18 notifies the selected plurality of colors while switching, according to an instruction of the user, a first notification for arranging the selected plurality of colors in order from a color closest to the measured color and notifying the selected plurality of colors to the user as approximate colors and a second notification for arranging the selected plurality of colors on the color space and notifying the selected plurality of colors to the user as approximate colors. For example, when the user gives a first instruction, the notifying section 18 performs the first notification for arranging the selected plurality of colors in order from the color closest to the measured color and notifying the selected plurality of colors to the user as the approximate colors. When the user gives a second instruction, the notifying section 18 performs the second notification for arranging the selected plurality of colors on the color space and notifying the selected plurality of colors to the user as the approximate colors. For example, the notifying section 18 performs the second notification for arranging the selected plurality of colors based on a positional relation on the color space and notifying the selected plurality of colors to the user as the approximate colors. The first instruction and the second instruction of the user are given using, for example, an operation section of the color measuring system 10.

The notifying section 18 performs processing for displaying a selection screen for a color sample book. The receiving section 14 receives designation of the color sample book by the user on the selection screen for the color sample book. For example, when the selection screen for the color sample book is displayed by the notifying section 18, which is a display processing section, the user gives an instruction for designating desired one or a plurality of color sample books out of a plurality of color sample books on the selection screen. Then, the receiving section 14 receives the designation of the color sample books by the user and performs processing for registering, in correlation with the user, the designated color sample books as color sample books used for comparison with the measured color.

The notifying section 18 performs processing for displaying color differences between the measured color and the approximate colors along with the approximate colors. For example, the notifying section 18 calculates ΔE, which is the color differences between the measured color and the approximate colors, based on a predetermined calculation method such as ΔE2000, ΔE1994, or ΔE1976 and displays the calculated color differences in association with the approximate colors. For example, the notifying section 18 performs processing for displaying the calculated color differences near a display region of the approximate colors.

The receiving section 14 receives a group of a plurality of colors as a user-defined custom color sample book. For example, an editing screen for a color sample book is displayed to the user. On the editing screen for the color sample book, the receiving section 14 adds a color designated by the user to the custom color sample book or delete the designated color from the custom color sample book and receives the custom color sample book as the user-defined custom color sample book. The user may add a color measured by executing the color measurement at this timing to the color sample book or may add a color selected from a history of the color measurement in the past to the color sample book. The user may add a color to the color sample book by inputting a color value. The receiving section 14 performs processing for registering, in correlation with the user, the received custom color sample book as a color sample book used for comparison with the measured color. The selecting section 16 performs processing for comparing the colors of the custom color sample book and the measured color and selecting colors close to the measured color out of the custom color sample book. The selecting section 16 may perform processing for selecting colors close to the measured color from both of a non-custom normal color sample book and the custom color sample book or may perform processing for selecting colors close to the measured color from one of the normal color sample book and the custom color sample book. When a plurality of color sample books are used, the selecting section 16 may perform selection processing for a color sample book based on priority set for the color sample books. That is, the color measuring system 10 may simultaneously treat only one color sample book or may simultaneously treat a plurality of color sample books. The color sample book means a group including a plurality of colors. The color sample book may consist of only colors customized by the user or may consist of colors prepared as default. The colors customized by the user and the colors prepared as default may be mixed.

The receiving section 14 receives designation of a color difference calculation method in performing the comparison of the colors of the color sample book and the measured color. The selecting section 16 selects colors close to the measured color out of the color sample book based on color differences calculated by the designated calculation method. For example, a selection screen for a color difference calculation method is displayed to the user. The receiving section 14 receives, on the selection screen, designation of a color difference calculation method designated by the user. For example, the receiving section 14 performs processing for registering, in correlation with the user, the color difference calculation method designated by the user as a color difference calculation method in performing comparison of the colors of the color sample book and the measured color. The selecting section 16 calculates color differences between the colors of the color sample book and the measured color using the color difference calculation method received by the receiving section 14 and selects colors close to the measured color out of the color sample book based on the calculated color differences.

The color measuring system 10 performs kinds of processing in this embodiment based on a program in this embodiment. The program is a program for causing a computer to function as the sections in this embodiment. The computer is a device including, for example, an operation section, a processing section, a storing section, and an output section. For example, the program in this embodiment is a program for causing the computer to function as the receiving section 14, the selecting section 16, and the notifying section 18. The program is stored in, for example, an information storage medium. That is, the color measuring system 10 in this embodiment can perform the kinds of processing in this embodiment based on the program stored in the information storage medium. The information storage medium, which is a computer-readable medium, stores programs, data, and the like. A function of the information storage medium can be realized by an optical disk, a hard disk device (HDD), a semiconductor memory, or the like.

Figure 2:
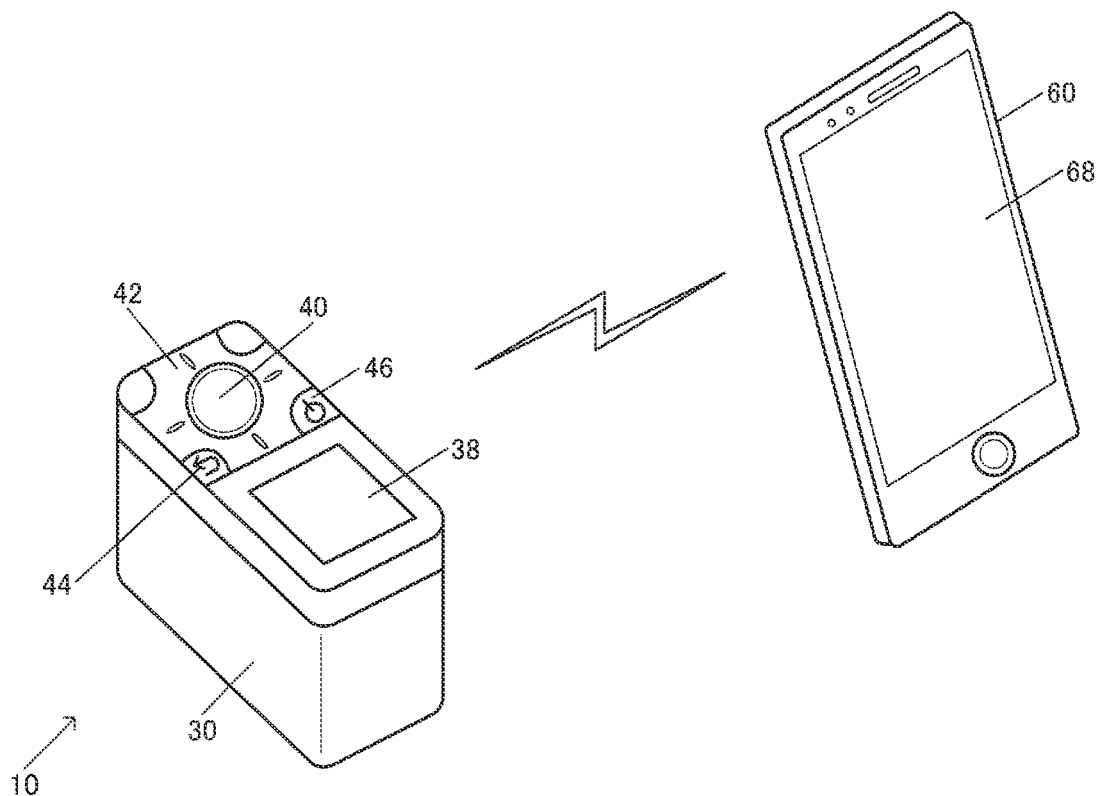
FIG. 2 is an example of an exterior view of a colorimeter and a terminal device that realize the color measuring system.
Figure 3:
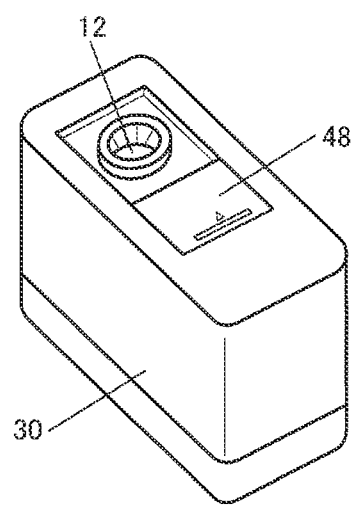
FIG. 3 is an example of an exterior view of the colorimeter.

FIGS. 2 and 3 are examples of exterior views of a colorimeter 30 and a terminal device 60 that realize the color measuring system 10 in this embodiment. As shown in FIG. 2, the colorimeter 30 has, for example, a substantially cubic shape. A display section 38, a color measurement button 40, and a cross key 42 are provided on the upper surface of the colorimeter 30. A return button 44 and a power button 46 are also provided on the upper surface of the colorimeter 30. On the other hand, as shown in FIG. 3, the color measuring section 12 and a shutter 48 are provided on the lower surface of the colorimeter 30. The display section 38 is realized by, for example, a liquid crystal display or an organic EL display and displays various kinds of information to the user. The color measurement button is an operation device for the user to instruct the colorimeter 30 to perform the color measurement. For example, when the user presses the color measurement button 40, the colorimeter 30 performs the color measurement using the color measuring section 12. The cross key 42 is an operation device for indicating, for example, upward, downward, left, and right directions. The return button 44 is a button for performing returning operation called back operation as well and is a button for performing ON and OFF of a power supply of the colorimeter 30. As explained above, the color measuring section 12 is realized by the color measurement sensor. For example, a plan view shape of the color measuring section 12 is a substantially circular shape. The shutter 48 protects the color measuring section 12 when the colorimeter 30 is not used. For example, when the colorimeter 30 is not used, the user performs operation for moving the shutter 48 in the direction of the color measuring section 12 and closing the shutter 48 to prevent a shock or the like from the outside from not being applied to the color measuring section 12.

The colorimeter 30 has a handy shape for enabling the user to grip the colorimeter 30 with one hand and perform the work of the color measurement. For example, the user grips side surfaces of the colorimeter 30 with the thumb and the middle finger, the third finger, the little finger, and the like and performs operation for pressing the color measurement button 40 with the index finger and indicating a direction with the cross key 42.

The terminal device 60 is a communication terminal communicably capable of coupling to the colorimeter 30 and is realized by, for example, a smartphone or a tablet PC (Personal Computer). The terminal device 60 is communicably coupled to the colorimeter 30 by wireless communication such as Bluetooth (registered trademark) or Wi-Fi (registered trademark). The terminal device 60 includes a display section 68. Operation devices such as an operation button are also provided in the terminal device 60. The display section 68 is, for example, a touch panel. The user touches the display section 68, which is the touch panel, to perform various kinds of operation.

FIG. 4 is a diagram showing a configuration example of the colorimeter 30 and the terminal device 60 and shows a configuration example of the color measuring system 10 including the colorimeter 30 and the terminal device 60. The colorimeter 30 and the terminal device 60 are not limited to configurations shown in FIG. 4. Various modified implementations are possible, for example, a part of components of the colorimeter 30 and the terminal device 60 may be omitted and other components may be added.

The colorimeter 30 includes the color measuring section 12, a processing section 32, an operation section 34, a storing section 36, the display section 38, and a communication section 39. As explained above, the color measuring section 12 is realized by the color measurement sensor or the like.

The processing section 32 performs control processing for sections of the colorimeter 30 and various kinds of processing in this embodiment. For example, the processing section 32 performs control processing for the color measuring section 12 and acquisition processing for color measurement data from the color measuring section 12. The processing section 32 performs input processing for operation information of the user input by the operation section 34, processing for reading out information from the storing section 36, and processing for writing information in the storing section 36. The processing section 32 performs processing for displaying information on the display section 38 and processing for controlling communication of the communication section 39. The processing section 32 can be realized by a processor. For example, the kinds of processing in this embodiment can be realized by a processor that operates based on information such as programs and a memory that stores the information such as programs. The memory is the storing section 36. For example, functions of sections of the processor may be realized by individual hardware or the functions of the sections may be realized by integrated hardware. For example, the processor includes hardware. The hardware can include at least one of a circuit that processes a digital signal and a circuit that processes an analog signal. For example, the processor can also be configured by one or a plurality of circuit devices or one or a plurality of circuit elements mounted on a circuit board. The processor may be, for example, a CPU (Central Processing Unit). However, the processor is not limited to the CPU. Various processors such as a GPU (Graphics Processing Unit) and a DSP (Digital Signal Processor) can be used. The processor may be a hardware circuit by an ASIC (Application Specific Integrated Circuit). The processor may include an amplifier circuit or a filter circuit that processes an analog signal.

The operation section 34 is an operation interface that inputs operation information of the user. The operation section 34 can be realized by operation devices. Referring to FIG. 2 as an example, the operation section 34 can be realized by operation devices such as the color measurement button 40, the cross key 42, the return button 44, and the power button 46. However, the operation devices realizing the operation section 34 are not limited to these operation devices.

The storing section 36 stores various kinds of information. For example, the storing section 36 stores programs and data. The storing section 36 functions as a work area for the processing section 32 and the communication section 39. For example, the storing section 36, which is the memory, may be a semiconductor memory such as an SRAM (Static Random Access Memory) or a DRAM (Dynamic Random Access Memory), may be a register, or may be a hard disk device or the like. For example, the storing section 36, which is the memory, stores a computer-readable instruction. The instruction is executed by the processing section 32, which is a processor, whereby processing of sections of the processing section 32 is realized. The instruction may be an instruction set configuring a program or may be an instruction for instructing an operation to a hardware circuit of the processor.

The display section 38 displays various kinds of information to the user. The display section 38 can be realized by various displays such as a liquid crystal display and an organic EL display. The display section 38 displays, for example, information necessary for the user to operate the colorimeter 30 and various kinds of status information of the colorimeter 30.

The communication section 39 is a communication interface that performs wireless or wired communication between the communication section 39 and an external device. The communication section 39 can be realized by hardware such as an ASIC for communication or a processor for communication, firmware for communication, and the like. For example, the communication section 39 performs communication with an external device such as the terminal device 60 by near field wireless communication such as Bluetooth (registered trademark). Specifically, the communication section 39 performs communication with the external device by wireless communication of a BLE (Bluetooth Low Energy) standard. Alternatively, the communication section 39 may perform communication with the external device by wireless communication of another standard such as Wi-Fi. The communication section 39 may perform wireless communication by a standard such as USB.

The terminal device 60 includes a processing section 62, an operation section 64, a storing section 66, the display section 68, and a communication section 69.

The processing section 62 performs control processing for the sections of the terminal device 60 and the kinds of processing in this embodiment. For example, the processing section 62 performs processing for inputting operation information of the user input by the operation section 64, processing for reading out information from the storing section 66, and processing for writing information in the storing section 66. The processing section 62 performs processing for displaying information on the display section 68, processing for controlling communication of the communication section 69, and the like. The processing section 62 can be realized by the processor or the like explained above.

The operation section 64 is an operation interface that inputs operation information of the user. The operation section 64 can be realized by operation devices. Referring to FIG. 2 as an example, the operation section 64 can be realized by operation devices such as operation buttons provided in a touch panel of the display section 68 or the terminal device 60. However, the operation devices realizing the operation section 64 are not limited to these operation devices.

The storing section 66 stores various kinds of information. For example, the storing section 66 stores programs and data. The data includes a color sample book. The storing section 66 functions as, for example, a work area for the processing section 62 and the communication section 69. For example, the storing section 66, which is a memory, may be a semiconductor memory such as an SRAM or a DRAM, may be a register, or may be a hard disk device or an optical disk device. For example, the storing section 66, which is the memory, stores a computer-readable instruction. The instruction is executed by the processing section 62, which is the processor, whereby processing of sections of the processing section 62 is realized.

The display section 68 displays various kinds of information to the user. The display section 68 can be realized by various displays such as a liquid crystal display and an organic EL display. The display section 68 is realized by, for example, a touch panel and functions as the operation section 64 as well. The display section 68 displays, for example, information necessary for the user to operate the terminal device 60 and various kinds of status information of the terminal device 60 and the colorimeter 30.

The communication section 69 is a communication interface that performs wireless or wired communication between the communication section 69 and an external device. The communication section 69 can be realized by hardware such as an ASIC for communication or a processor for communication, firmware for communication, and the like. For example, the communication section 69 performs communication with an external device such as the colorimeter 30 by near field wireless communication such as Bluetooth. Specifically, the communication section 69 performs communication with the external device by wireless communication of the BLE standard. Alternatively, the communication section 69 may perform communication with the external device by wireless communication of another standard such as Wi-Fi (registered trademark). The communication section 69 may perform wired communication by a standard such as USB.

The processing of the color measuring system 10 in this embodiment may be realized by, for example, the processing section 62 of the terminal device 60. In this case, the processing section 62 includes the receiving section 14, the selecting section 16, and the notifying section 18 and performs processing of these sections. For example, the program in this embodiment is installed in the terminal device 60 as an application program and stored in the storing section 66. The application program executes the kinds of processing of the receiving section 14, the selecting section 16, and the notifying section 18. Alternatively, the processing of the color measuring system 10 may be realized by the processing section 32 of the colorimeter 30. In this case, the processing section 32 includes the receiving section 14, the selecting section 16, and the notifying section 18 and performs processing of these sections. For example, a program stored in the storing section 36 executes the kinds of processing of the receiving section 14, the selecting section 16, and the notifying section 18. Alternatively, the processing of the color measuring system 10 may be realized by distributed processing of the processing section 32 and the processing section 62.

2. Display of Approximate Colors Based on the Color Sample Book

For example, in printing including a logo or a team color, a color having a specific tint sometimes has to be printed in any area of a print. The color having the specific tint is called specific color as well. In the past, a client requesting printing brings a target color with the client or orally conveys a color treated in the past or a color present in a signboard or the like. A printing company determines a color of the print while visually checking a sample actually printed.

However, in oral communication, since it is difficult to accurately convey the specific color, it takes time to grasp the target color and it is likely that the printing company has to communicate many times. When the client brings the target color with the client, if the target color is a color that the printing company treats for the first time, it takes time and cost to create the color. Depending on a color, a due date, and company knowhow, a designated color is sometimes not created. In this case, at first, the client cannot imagine what kind of a color the color of the print will be.

In order to solve such problems, in the printing industry, a color sample book serving as a booklet obtained by bundling color samples is created. If the booklet is used, the number of colors is limited but, instead, communication including color values can be performed from the beginning. Therefore, a time for creating the color can be reduced. If the client more often designates colors from the booklet because the client can assume a color and feels relief, the printing company can reduce chances of designating a color treated for the first time.

However, the number of colors stored in the booklet is as many as several hundred to several thousand. Work for finding a color from the booklet is hard and takes time. Depending on experience in handling of the booklet, a situation occurs in which a color closest to a designated color cannot be found.

Therefore, the color measuring system 10 in this embodiment receives designation of a color sample book, compares colors of the color sample book and a measured color, selects colors close to the measured color out of the color sample book, and notifies the colors to the user as approximate colors of the measured color. For example, the color measuring system 10 extracts colors close to the measured color out of the color sample book and displays the colors in order from a color having the smallest color difference ΔE from the measured color.

Figure 5:
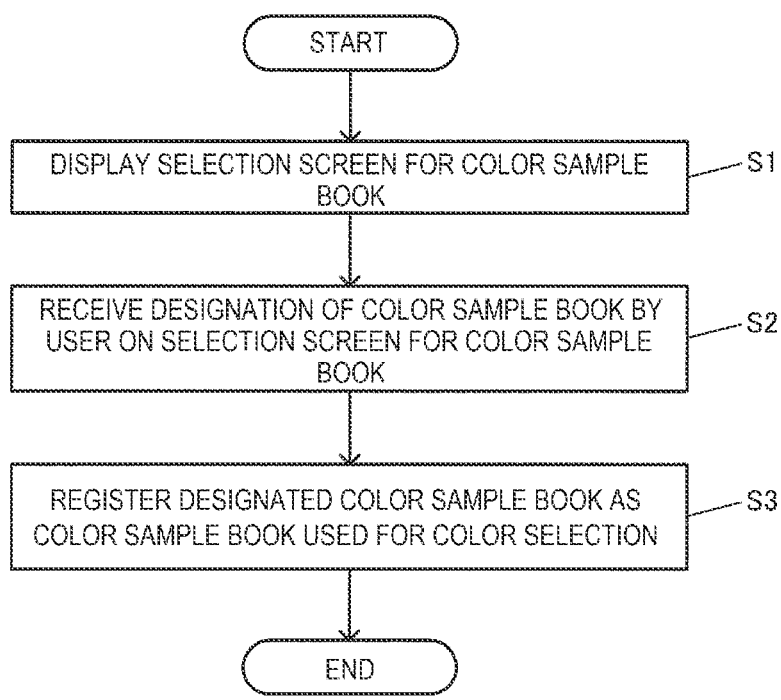
FIG. 5 is a flowchart for explaining a processing example in an embodiment.
Figure 6:
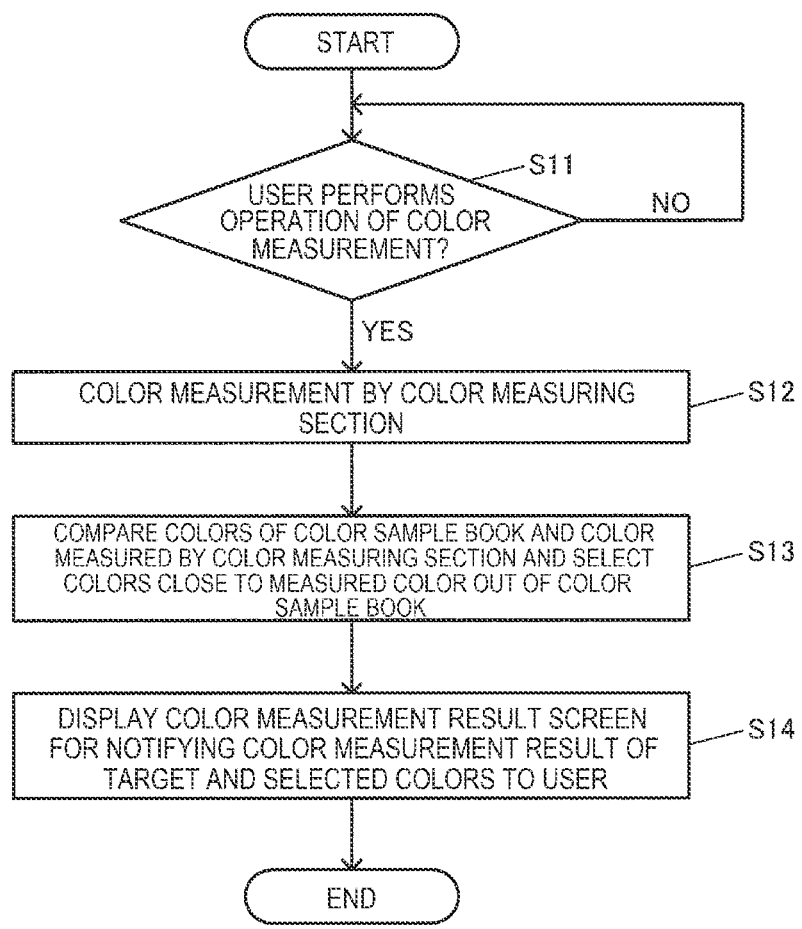
FIG. 6 is a flowchart for explaining a processing example in the embodiment.

FIGS. 5 and 6 are flowcharts for explaining processing in this embodiment. As shown in FIG. 5, the color measuring system 10 displays a selection screen for a color sample book (step S1). For example, the color measuring system 10 displays a selection screen for a color sample book shown in FIGS. 8 and 12 explained below. Subsequently, the color measuring system 10 receives designation of the color sample book by the user on the selection screen for the color sample book (step S2). For example, the color measuring system 10 receives, on the selection screen for the color sample book, operation of the user for designating a desired color sample book out of a plurality of color sample books. The color measuring system 10 registers the color sample book designated by the user as a color sample book used for color selection (step S3). For example, the color measuring system 10 registers, in correlation with the user, the color sample book designated by the user.

As shown in FIG. 6, the color measuring system 10 determines whether the user performs operation of color measurement (step S11). For example, the color measuring system 10 determines whether the user presses the color measurement button 40 shown in FIG. 2. Alternatively, the color measuring system 10 determines whether the user selects an icon of a color measurement button shown in A3 in FIG. 7 explained below. When the user performs the operation of the color measurement, the color measuring system 10 performs the color measurement by the color measuring section 12 (step S12). For example, the color measuring section 12 measures a target color and outputs a color measurement value, which is a color of the measured color. The color value is, for example, Lab values. However, the color value in this embodiment is not limited to the Lab values and may be a color value represented by another form. L, a, and b are formally described as L*, a*, and b* and the Lab values are formally described as L*a*b* values. However, in this embodiment, L*, a*, and b* and the L*a*b* values are described as L, a, and b and the Lab values as appropriate as abbreviations. The color measuring system 10 compares colors of the color sample book and a color measured by the color measuring section 12 and selects colors close to the measured color from the color sample book (step S13). For example, the color measuring system 10 selects, from the color sample book, colors having small color differences from the measured color, for example, one or more colors having color differences equal to or smaller than a predetermined value. The color measuring system 10 displays a color measurement result screen for notifying a target color measurement result and the selected color to the user (step S14). For example, the color measuring system 10 displays a color measurement result screen shown in FIG. 10 explained below. On the color measurement result screen, approximate colors are displayed in order from a color closest to the measured color. Specifically, on the color measurement result screen, the approximate colors are displayed in order from a color having the smallest ΔE, which is a color difference from the measured color. The color difference ΔE is, for example, a value defined by ΔL, Δb and Δc, which are differences in L, a, and b between Lab values of the measured color and the approximate colors. ΔE, ΔL, Δb and Δc are formally described as ΔE*, ΔL*, Δb* and Δc*. However, in this embodiment, ΔE*, ΔL*, Δb* and Δc* are described as ΔE, ΔL, Δb and Δc as appropriate as abbreviations.

As explained above, in this embodiment, the receiving section 14 receives the designation of the color sample book. In this way, designation of a color sample book for performing color comparison is received. Comparison of colors of the designated color sample book and a measured color is performed. Colors close to the measured color are selected out of the designated color sample book. The selected colors are notified to the user as approximate colors. In this way, the color measuring system 10 can automatically select colors close to the measured color out of the designated color sample book and notify the colors to the user. Therefore, since the approximate colors of the measured color are notified to the user, the user is capable of easily instructing a color desired by the user to the printing company out of the designated color sample book. The user is capable of using, as narrowing-down condition in selecting approximate colors of the measured color, existing color sample books such as PANTONE (registered trademark) and DIC color (DIC is a registered trademark) used as standards in the printing industry. Consequently, when determining a color of a print, which is a delivered product, the user can determine a color at ease. Since the approximate colors of the measured color are selected out of the color sample book, for example, communication between the user and the printing company or the like becomes easy. A time for creating and determining a color can be reduced. Since a color is designated out of the colors of the color sample book, occurrence of a situation in which a color treated by the printing company for the first time is designated decreases. Since the selection of the approximate colors from the color sample book is automatically performed by processing of a computer, it is possible to prevent occurrence of a situation in which work for finding out a color is hard. Since data of the designated color sample book is saved in the storing section of the color measuring system 10, it is unnecessary to carry the booklet of the color sample book. Therefore, convenience is improved.

Subsequently, various screen examples displayed by the color measuring system 10 in this embodiment are explained. These screens are displayed on the display section 68 of the terminal device 60 such as a smartphone. However, a modified implementation for displaying these screens or screens obtained by simplifying these screens on the display section 38 of the colorimeter 30 is also possible.

Figure 7:
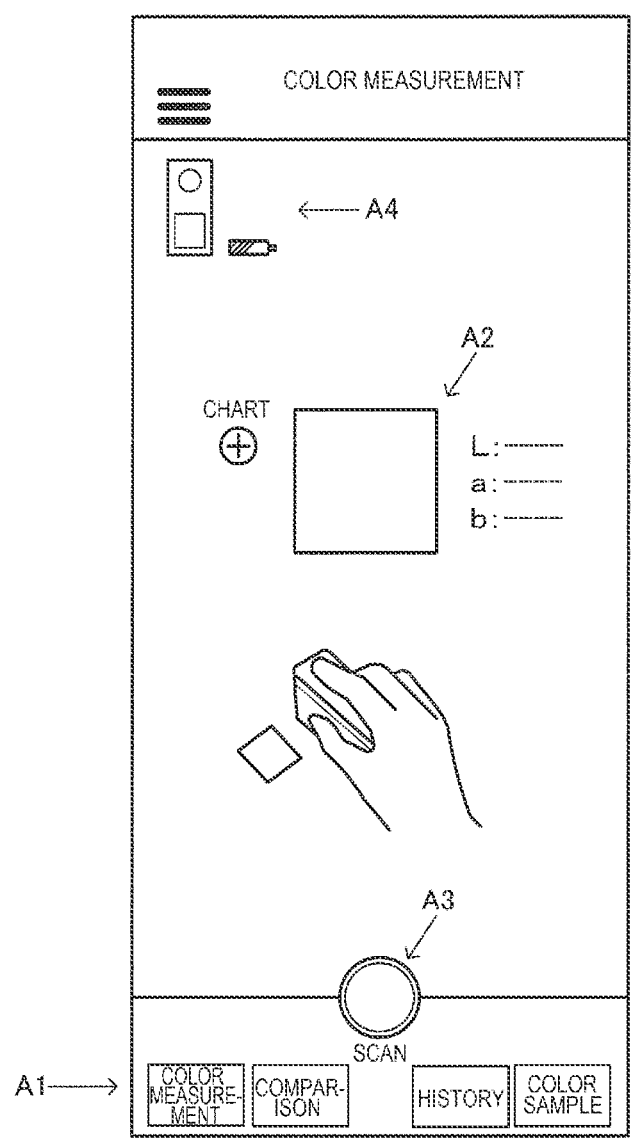
FIG. 7 is an example of a home screen.

FIG. 7 is a diagram showing an example of a home screen. When the user selects, for example, icons of "color measurement", "comparison", "history", and "color sample" shown in A1 on the home screen, the home screen shifts to a color measurement result screen, a color comparison screen, a history screen of colors measured in the past, and a selection screen for a color sample book. The selection of the icons or the like on the display section 68 is realized by touch operation on the display section 68, which is a touch panel. On the home screen shown in FIG. 7, since the user has not performed the operation of the color measurement yet, a color measurement result is not displayed as shown in A2 in FIG. 7. When the user desires to perform the operation of the color measurement, for example, the user performs operation for pressing the color measurement button 40 shown in FIG. 2 or selecting an icon of a color selection button shown in A3 in FIG. 7. As shown in A4 in FIG. 7, status information such as battery remaining power of the colorimeter 30 is displayed on the screen.

Figure 8:
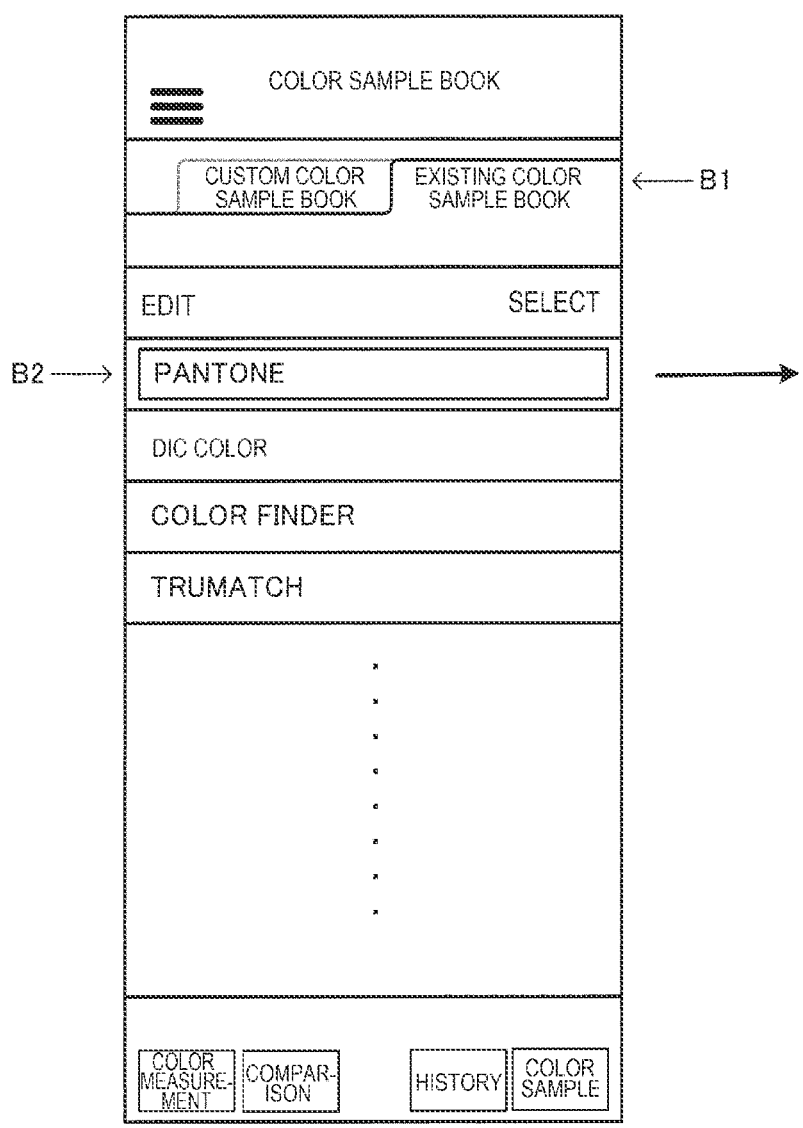
FIG. 8 is an example of a selection screen for a color sample book.
Figure 9:
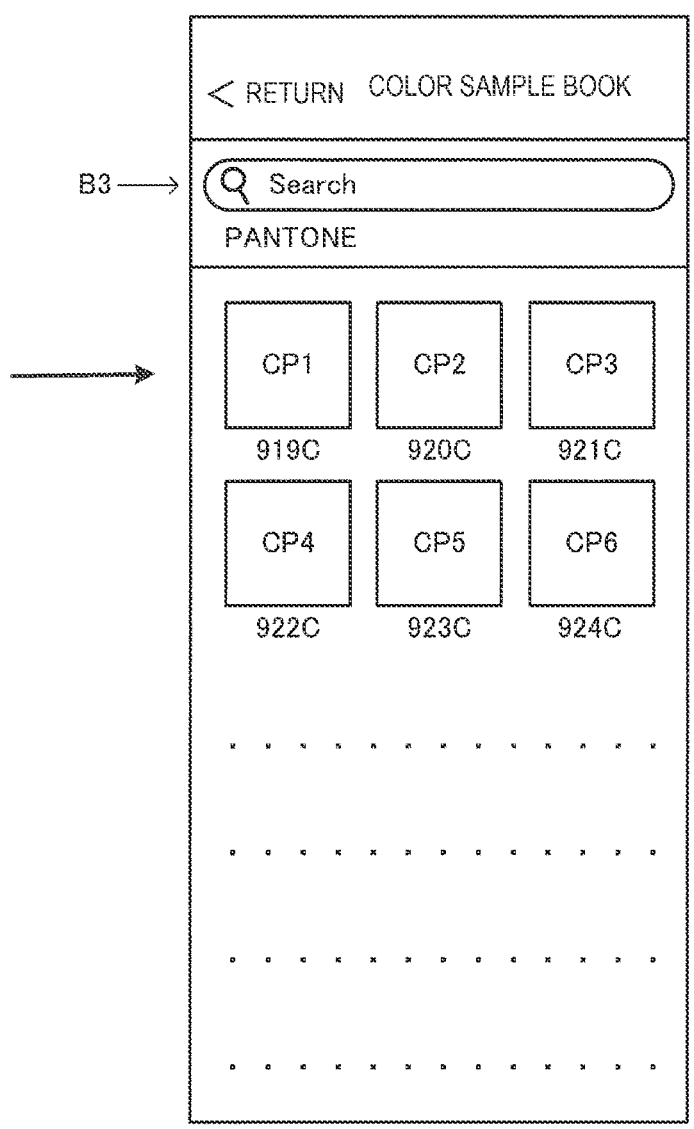
FIG. 9 is an example of a detail screen of the color sample book.

FIG. 8 is a diagram showing an example of the selection screen for the color sample book. By selecting a tab shown in B1 in FIG. 8, the user can designate display of existing color sample books and display of a custom color sample book. In FIG. 8, as the existing color sample books, color sample books that are standards in the industry such as PANTONE, DIC color, COLOR FINDER, and TRU-MATCH are displayed. When the user performs selection for designating a desired color sample book out of these color sample books, the designation of the color sample book is received. For example, the designated color sample book is registered in correlation with the user. When the user performs operation for checking, for example, details of PANTONE shown in B2 in FIG. 8, a screen shown in FIG. 9 is displayed. In FIG. 9, colors CP1 to CP6 and the like of the color sample book of PANTONE and color numbers of these colors are displayed. The user can also perform a search for a color out of the color sample book by using a search box in B3 in FIG. 9.

In this way, in this embodiment, the notifying section 18 performs the processing for displaying the selection screen for the color sample book and the receiving section 14 receives designation of the color sample book by the user on the selection screen for the color sample book. As explained above, the receiving section 14, the selecting section 16, and the notifying section 18 shown in FIG. 1 are realized by the processing section 32 and the processing section 62 shown in FIG. 4. In this way, the user can designate a color sample book used for comparison with the measured color by selecting a desired color sample book on the selection screen for the color sample book. Approximate colors of the measured color are selected out of colors of the color sample book and notified to the user.

Figure 10:
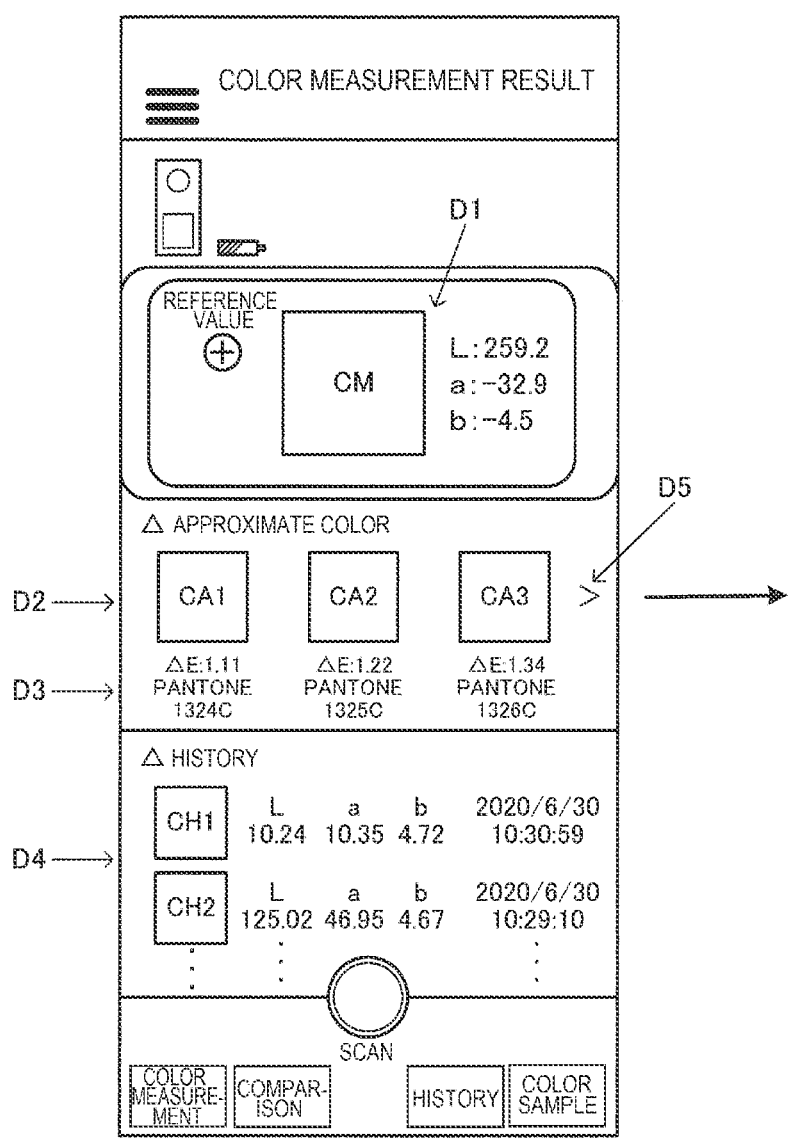
FIG. 10 is an example of a color measurement result screen.

FIG. 10 is a diagram showing an example of a color measurement result screen. When the user operates the color measurement button 40 of the colorimeter 30 or operates the icon of the color measurement button on the screen, the color measurement result screen shown in FIG. 10 is displayed. On the color measurement result screen, as shown in D1 in FIG. 10, a measured color CM and Lab values, which are color measurement values of CM, are displayed. In the display of the measured color CM, a schematic color of the measured color CM is displayed. The schematic color is, for example, a color obtained by representing the measured color with RGB values and is an image representing a schema of the measured color. Display of schematic colors about other colors is the same.

In this embodiment, as shown in D2 in FIG. 10, approximate colors CA1, CA2, and CA3 of the measured color CM are displayed. For example, a plurality of colors are selected out of the colors of the color sample book in order from a color closest to the measured color CM. The selected plurality of colors are arranged in order from the color closest to the measured color CM and displayed as the approximate colors CA1, CA2, and CA3. Specifically, the color differences $\Delta E$ between the measured color CM and the colors of the designated color sample book are calculated. The approximate colors CA1, CA2, and CA3 are arranged and displayed in order from a color having the smallest color difference $\Delta E$. For example, as shown in D3 in FIG. 10, the color differences $\Delta E$ between the measured color CM and the approximate colors CA1, CA2, and CA3 are, for example, 1.11, 1.22, and 1.34. Among CA1 to CA3, the color difference $\Delta E=1.11$ about the approximate color CA1 is the smallest and the color difference $\Delta E=1.34$ about the approximate color CA3 is the largest. As shown in D3, the approximate colors CA1 to CA3 are selected out of PANTONE, which is the color sample book designated by the user.

In this way, in this embodiment, the selecting section 16 selects a plurality of colors out of the colors of the color sample book in order from a color closest to the measured color CM. The notifying section 18 arranges the selected plurality of colors in order from the color closest to the measured color CM and notifies the selected plurality of colors to the user as the approximate colors CA1 to CA3. The selecting section 16 and the notifying section 18 are realized by the processing section 32 and the processing section 62. In this way, it is possible to automatically select a plurality of colors close to the measured color CM out of the designated color sample book, arrange the plurality of colors in order from a color closest to the measured color CM, and notify the plurality of colors to the user as the approximate colors CA1 to CA3. Consequently, the user is capable of visually easily recognize which approximate color of the notified approximate colors CA1 to CA3 is closer to the measured color CM.

In this embodiment, as shown in D3 in FIG. 10, the notifying section 18 performs processing for displaying the color differences $\Delta E$ between the measured color CM and the approximate colors CA1 to CA3 along with the approximate colors CA1 to CA3. In D3 in FIG. 10, a numerical value of the color difference $\Delta E$ between each of the approximate colors CA1 to CA3 and the measured color CM is displayed near a display region of the approximate colors CA1 to CA3. In this way, the user can easily check not only schemas of colors of the approximate colors CA1 to CA3 but also specific color differences $\Delta E$ between the approximate colors CA1 to CA3 and the measured color CM. Therefore, work for selecting a color desired by the user out of the approximate colors CA1 to CA3 corresponding to the measured color CM becomes easy. Convenience of the user can be improved.

On the color measurement result screen shown in FIG. 10, as shown in D4, a history of color measurement results in the past is also displayed. For example, information concerning a color value and a measurement time of a color CH1 measured the last time and information concerning a color value and a measurement time of a color CH2 measured the time before last are displayed.

Figure 11:
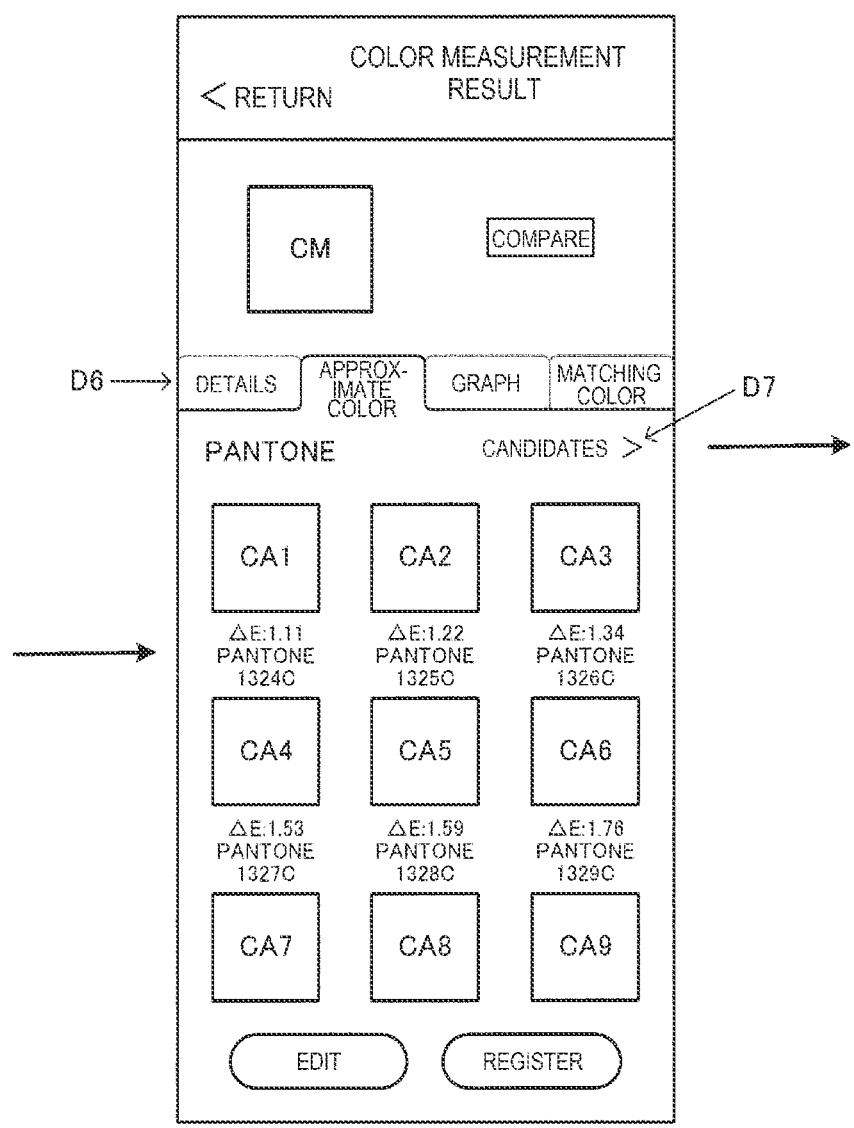
FIG. 11 is an example of the color measurement result screen.
Figure 12:
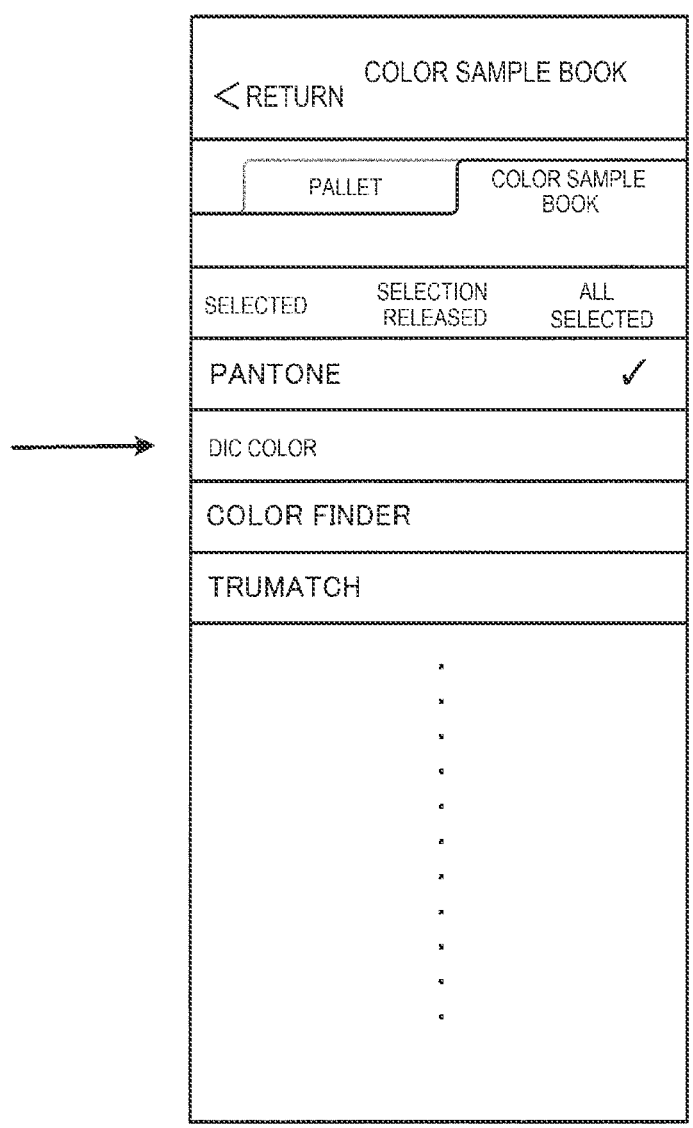
FIG. 12 is an example of selection of the color sample book on the color measurement result screen.

When the user selects an icon shown in D5 in FIG. 10, a color measurement result screen shown in FIG. 11 is displayed. In FIG. 11, approximate colors CA1 to CA9 more than the approximate colors shown in FIG. 10 are arranged and displayed in order from a color having the smallest color difference $\Delta E$ from the measured color CM. As shown in D6 in FIG. 11, tabs for displaying various kinds of information are also prepared. When the user selects an icon of a candidate shown in D7 in FIG. 11, a screen about a color sample book shown in FIG. 12 is displayed. In FIG. 12, for example, a color sample book of PANTONE is selected as a color sample book for selecting approximate colors of the measured color CM. The user is also capable of selecting, for example, other color sample books such as DIC color in FIG. 12. For example, when color sample books of PANTONE and DIC color are selected, the measured color CM and colors of the color sample books of PANTONE and DIC color are compared. Approximate colors of the measured color CM are displayed to the user. In this case, information for enabling the user to identify from which of the color sample books of PANTONE and DIC color the approximate colors are selected is displayed along with the approximate colors. For example, characters of PANTONE and DIC color are displayed along with the approximate colors. When two or more color sample books are selected, priority may be set for the color sample books. The comparison with the measured color CM and the display of the approximate values may be performed according to the priority.

Figure 13:
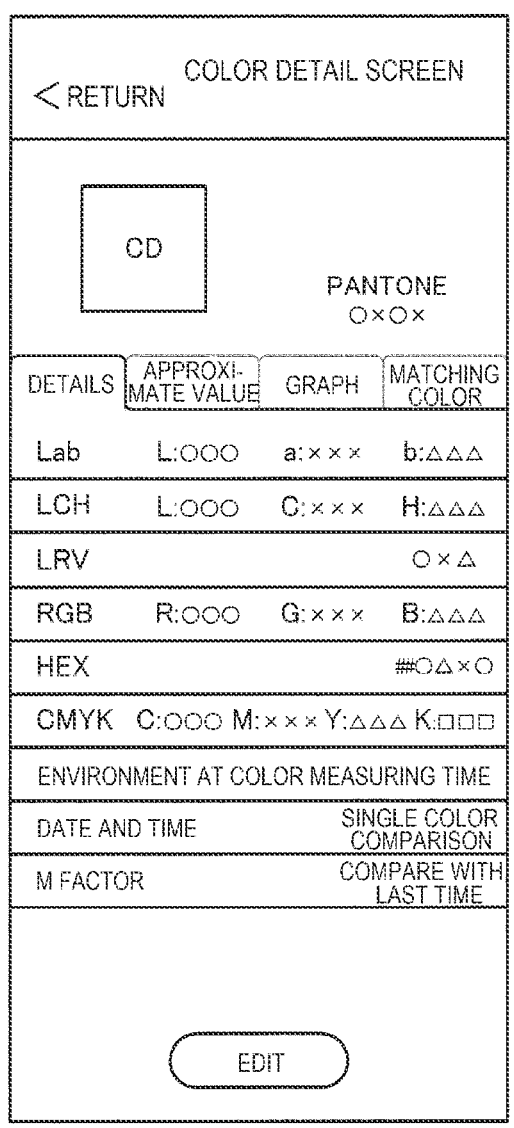
FIG. 13 is an example of a color detail screen.

FIG. 13 is a diagram showing an example of a color detail screen. On the color detail screen shown in FIG. 13, color values are displayed in formats such as Lab values, LCH values, LRV values, RGB values, HEX values, and CMYK values about a color CD selected by the user from the colors of the color sample book. When the color sample book is a custom color sample book, environment information at the time when the color measurement is performed in order to customize the color sample book is also displayed.

Various methods are conceivable as a method of displaying approximate colors of the measured color CM and notifying the approximate colors to the user. For example, in E1 in FIG. 14, the selecting section 16 selects a plurality of colors out of the colors of the color sample book in order from a color closest to the measured color CM and the notifying section 18 arranges the selected plurality of colors in order from a color closest to the measured color CM and notifies the selected plurality of colors to the user as approximate values CA1 to CA4. For example, the approximate color CA1 is the closest to the measured color and has the smallest color difference $\Delta E$. The approximate color CA2 is the second closest after the approximate color CA1. The color difference $\Delta E$ of the approximate color CA2 is larger than the color difference $\Delta E$ of the approximate color $\Delta E$.

Besides, the selecting section 16 may select, out of the colors of the color sample book, a plurality of colors having color differences from the measured color smaller than a given value. The notifying section 18 may arrange the selected plurality of colors on a color space and notify the selected plurality of colors to the user. For example, in E2 in FIG. 14, an example is shown in which approximate colors are arranged according to a positional relation on the color space, converted into two dimensions, and displayed. Specifically, in E2 in FIG. 14, an example is shown in which, in a color space of Lab, approximate colors CA11 and CA12 are present as colors different in only a L component in order from a color closest to the measured color CM, approximate colors CA21 and CA22 are present as colors different in only an "a" component in order from a color closest to the measured color CM, and approximate colors CA31 and CA32 are present as colors different in only a "b" component in order from a color closest to the measured color CM. In this example, the approximate colors CA11 and CA12 are arranged in an axial direction of L in order from a color closest to the measured color CM in an L value, the approximate color CA21 and CA22 are arranged in an axial direction of "a" in order from a color closest to the measured color CM in an "a" value, and the approximate values CA31 and CA32 are arranged in an axial direction of "b" in order from a color closest to the measured color CM in a "b" value. Naturally, when an approximate color different from the measured color CM is present in a minus direction of a color component, the approximate color in the minus direction of the axis is arranged. When an approximate color different from the measured color CM in a plurality of color components is present, the approximate color is arranged in a position not on the axis but on a color space of the approximate color. In this way, approximate colors close to the measured color CM are displayed in the color space. The user can easily grasp in which direction in the color space the approximate colors are close to the measured color CM. Therefore, work for finding out a color desired by the user out of the color sample book can be facilitated. Convenience of the user is improved. In E2 in FIG. 14, the approximate colors in the three axial directions of L, a, and b are displayed. However, this embodiment is not limited to this. Various modified implementations for, for example, displaying approximate colors in two axial directions among L, a, and b are possible. If three-dimensional display is possible. The color space may be kept displayed in three dimensions without being converted into two dimensions.

Figure 14:
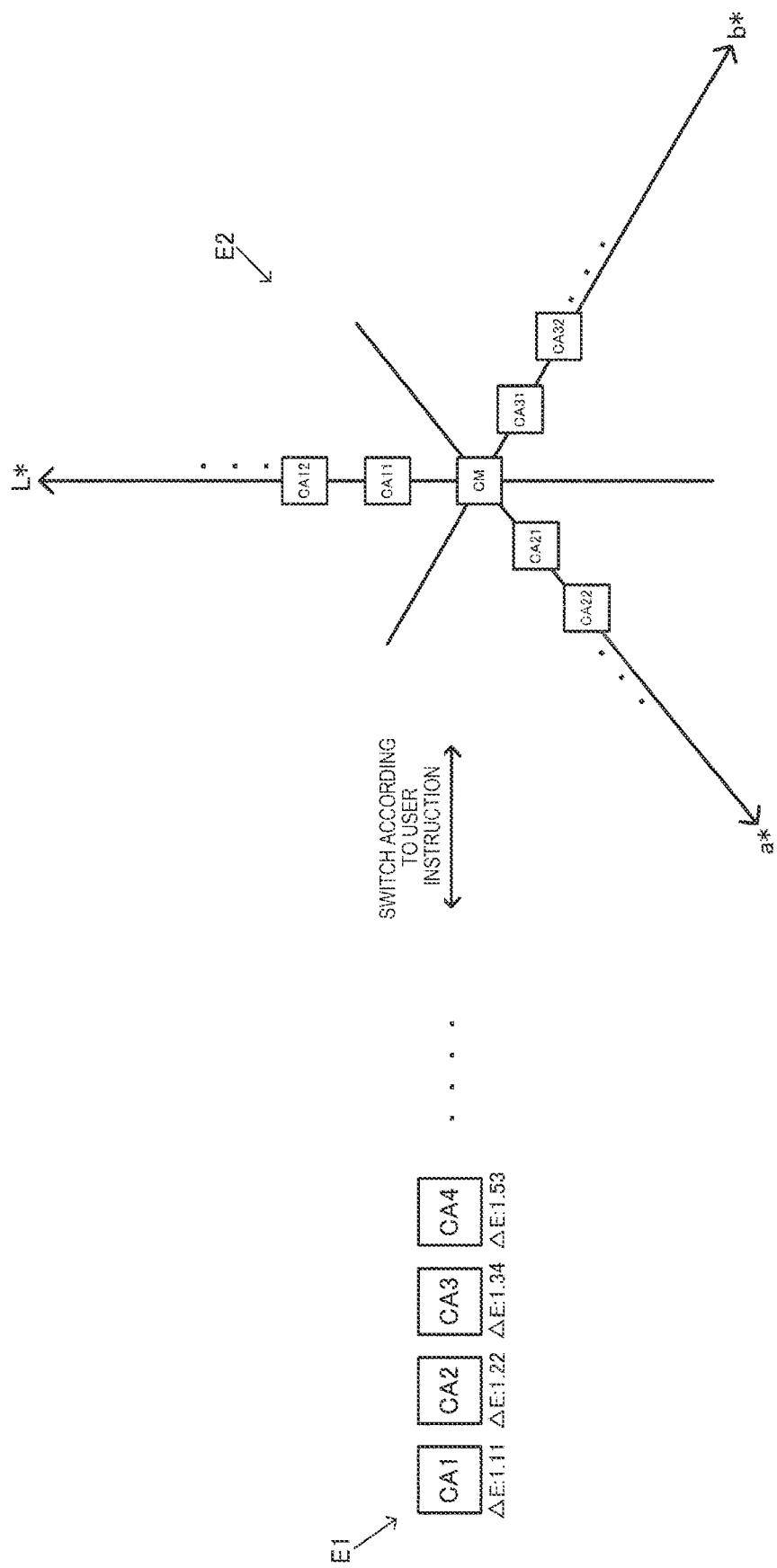
FIG. 14 is an explanatory diagram of a first notification and a second notification in the embodiment.

As shown in E1 in FIG. 14, the notifying section may notify the selected plurality of colors while switching, according to an instruction of the user, a first notification for arranging the selected plurality of colors in order from a color closest to the measured color and notifying the selected plurality of colors to the user as approximate colors and a second notification for arranging the selected plurality of colors on the color space and notifying the selected plurality of colors to the user as approximate colors. For example, when the user performs operation of a first instruction, the notifying section 18 performs the first notification for arranging the approximate colors in order from a color closest to the measured color as shown in E1. When the user performs operation of a second instruction, the notifying section 18 performs the second notification for arranging the approximate colors on the color space as shown in E2. In this way, the notification of the approximate colors in a notification form desired by the user can be performed, for example, the first notification shown in E1 is performed for a user who desires arrangement of the approximate colors corresponding to color differences and the second notification shown in E2 is performed for a user who desires arrangement of the approximate colors in the color space. Therefore, appropriate notification processing for the approximate colors corresponding to use and desire of the user can be realized.

The receiving section 14 receives a group of a plurality of colors as a user-defined custom color sample book. For example, in FIG. 15, the user performs operation for designating a custom color sample book CSB2 out of user-defined custom color sample books CSB1, CSB2, CSB3, and the like. Consequently, the custom color sample book CSB2 is selected as a color sample book for selecting approximate colors. Comparison of colors of the custom color sample book CSB2 and the measured color CM is performed. Colors close to the measured color CM are selected out of the custom color sample book CSB2 and notified to the user as approximate colors of the measured color CM. For example, a group of a plurality of colors is selected by editing operation, whereby the group of the plurality of colors is defined and registered as a custom color sample book. In this way, comparison with a measured color is performed using not an existing color sample book such as PANTONE but an originally created custom color sample book. Approximate colors of the measured color are displayed. For example, a printing company or the like registers a group of colors treated by the printing company in the past as a custom color sample book. A client determines, using the color measuring system 10 in this embodiment, a color to be printed on a print out of colors selected from the custom color sample book by the color measuring system 10. In this way, the color to be printed on the print can be determined out of colors having printing results.

Figure 16:
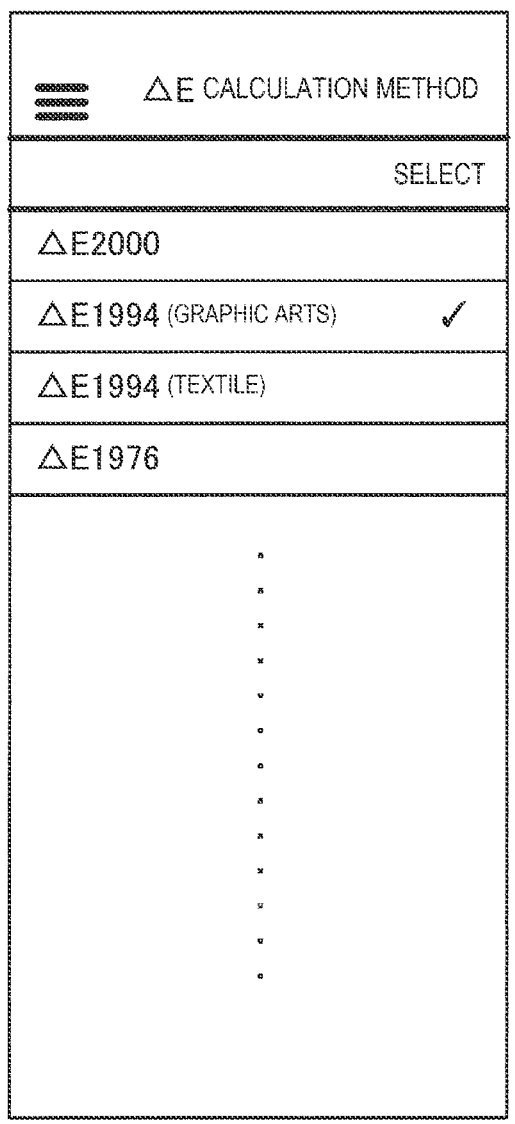
FIG. 16 is an explanatory diagram about designation of a calculation method for $\Delta E$.

In this embodiment, the receiving section 14 receives designation of a color difference calculation method in performing comparison of colors of a color sample book and the measured color CM. The selecting section 16 selects colors close to the measured color CM out of the color sample book based on the color difference calculated by the received calculation method. For example, FIG. 16 is an example of a selection screen for a color difference calculation method. In FIG. 16, as a calculation method for the color difference $\Delta E$, calculation methods such as $\Delta E2000$, $\Delta E1994$ (graphic arts), $\Delta E1994$ (textile), and $\Delta E1976$ can be selected. For example, $\Delta E1976$ is called CIE76, is a color difference formula defined in 1976, and is defined as an Euclidian distance in an Lab color space, which is a CIE LAB color space. The Lab color space is a color space in which a color is represented by a coordinate on an equal color space consisting of brightness L and chromaticness indexes "a" and "b". However, the color difference $\Delta E$ and evaluation by human eyes are different depending on a color. This is because the shape of a color discrimination region of the human eyes has perceptual nonuniformity unlike a range of an allowable color difference in the Lab color space. $\Delta E1994$ called CIE94 is expanded to be adapted to the perceptual nonuniformity while using the Lab color space. Specifically, in $\Delta E1994$, a weighting coefficient for a specific use is introduced. Values of the weighting coefficient are different in $\Delta E1994$ (graphic arts) and $\Delta E1994$ (textile). $\Delta E2000$ called CIEDE2000 defines a calculation formula such that a color difference based on calculation is approximate to the color discrimination region of the human eyes on the Lab color space. Specifically, weighting is performed by a weight value coefficient based on a brightness difference, a chroma difference, and a hue difference. The weight value coefficient takes into account the influence of brightness, chroma, and a hue angle. In the calculation formula, chroma dependency, hue dependency, and brightness dependency, which are characteristics of the color discrimination region of the human eyes on the Lab color space, are considered. In this way, in this embodiment, designation of a color difference calculation method is received and colors close to a measured color are selected out of a color sample book based on a color difference calculated by the received calculation method and are notified to the user as approximate colors of the measured color. In this way, color differences between the measured color and colors of the color sample book are calculated using a color difference calculation method desired by the user. Approximate colors selected based on the color differences are notified to the user. Therefore, approximate colors based on an appropriate color difference calculation method corresponding to use, a use form, and the like of a color by the user can be presented to the user as approximate colors of the measured color.

Various modified implementations of this embodiment are possible. For example, color values and a color difference calculation method are not limited to those explained in this embodiment. When a plurality of colors, color differences of which from the measured color are completely the same, are present, these colors may be notified to the user in the order of registered color sample books. The user may be caused to select priority of color sample books used in determining approximate colors. The user may be caused to select priority levels of L, a, and b in the Lab color space in determining approximate values.

As explained above, this embodiment relates to a color measuring system including: a color measuring section configured to perform color measurement; a receiving section configured to receive designation of a color sample book; a selecting section configured to, in response to the color measurement being performed, compare colors of the color sample book and a color measured by the color measuring section and automatically select colors close to the measured color out of the color sample book; and a notifying section configured to notify the selected colors to a user as approximate colors of the measured color.

According to this embodiment, the colors close to the measured color can be automatically selected out of the designated color sample book and notified to the user as the approximate colors. Therefore, the user can more easily select a desired color than selecting the desired color out of a large number of colors of the color sample book.

In this embodiment, the selecting section may select a plurality of colors out of the colors of the color sample book in order from a color closest to the measured color, and the notifying section may arrange the selected plurality of colors in order from the color closest to the measured color and notify the selected plurality of colors to the user as the approximate colors.

In this way, it is possible to automatically select a plurality of colors close to the measured color out of the designated color sample book and arrange the plurality of colors in order from a color closest to the measured color and notify the plurality of colors to the user.

In this embodiment, the selecting section may select a plurality of colors out of the colors of the color sample book in order from a color closest to the measured color, and the notifying section may arrange the selected plurality of colors on a color space and notify the selected plurality of colors to the user as the approximate colors.

In this way, it is possible to cause the user to easily recognize how the plurality of colors selected in order from the color closest to the measured color are arranged in the color space.

In this embodiment, the selecting section may select a plurality of colors out of the colors of the color sample book in order from a color closest to the measured color, and the notifying section may notify the selected plurality of colors while switching, according to an instruction of the user, a first notification for arranging the selected plurality of colors in order from a color closest to the measured color and notifying the selected plurality of colors to the user as the approximate colors and a second notification for arranging the selected plurality of colors on a color space and notifying the selected plurality of colors to the user as the approximate colors.

In this way, the notification of the approximate colors in a notification form desired by the user can be performed, for example, the first notification is performed for a user who desires arrangement of the approximate colors corresponding to color differences and the second notification is performed for a user who desires arrangement of the approximate colors in the color space.

In this embodiment, the notifying section may perform processing for displaying a selection screen for the color sample book, and the receiving section may receive designation of the color sample book by the user on the selection screen for the color sample book.

In this way, the user can designate a color sample book used for comparison with the measured color by selecting a desired color sample book on the selection screen for the color sample book.

In this embodiment, the notifying section may perform processing for displaying color differences between the measured color and the approximate colors along with the approximate colors.

In this way, the user can easily check the color differences between the approximate colors and the measured color. Work for selecting a color desired by the user out of the approximate colors of the measured color becomes easy. Convenience of the user can be improved.

In this embodiment, the receiving section may receive a group of a plurality of colors as a user-defined custom color sample book.

In this way, comparison with the measured color is performed using not an existing color sample book but an originally created custom color sample book. The approximate colors of the measured color are notified.

In this embodiment, the receiving section may receive designation of a color difference calculation method in performing comparison of the colors of the color sample book and the measured color, and the selecting section may select colors close to the measured color out of the color sample book based on a color difference calculated by the calculation method.

In this way, color differences between the measured color and the colors of the color sample book are calculated using a color difference calculation method desired by the user. Approximate values selected based on the color differences are notified to the user.

This embodiment relates to a program for causing a computer, which communicates with a color measuring section, to function as: a receiving section configured to receive designation of a color sample book; a selecting section configured to, in response to color measurement being performed by the color measuring section, compare colors of the color sample book and a color measured by the color measuring section and automatically select colors close to the measured color out of the color sample book; and a notifying section configured to notify the selected colors to a user as approximate colors of the measured color.

This embodiment is explained in detail above. It would be easily understood by those skilled in the art that many modifications not substantially departing from the new matters and the effects of this embodiment are possible. Therefore, all of such modifications are deemed to be included in the scope of the present disclosure. For example, terms described together with broader or synonymous different terms at least once in the specification or the drawings can be replaced with the different terms in any parts of the specification and the drawings. All combinations of this embodiment and the modifications are also included in the scope of the present disclosure. The configurations, the operations, and the like of the color measuring system, the colorimeter, the terminal device, and the like, a color measuring method, a method of producing a print through color measurement, and the like are not limited to those explained in this embodiment and various modified implementations are possible. Entities and functions of the operations explained in this embodiment may be included in an integral device or may be included in a plurality of devices that distributedly execute the operations. For example, all of the functions of the colorimeter 30 and the terminal device 60 explained in this embodiment may be included in the colorimeter 30. For example, the colorimeter 30 may include only a color measuring function and the terminal device 60 may include all of the other functions.

For example, the colorimeter 30 may include other input means such as a touch panel display and a microphone and may not include a cross key. The colorimeter 30 may not include a display. In this case, the colorimeter 30 may perform notification by sound or may project a large screen to the outside. The notification is operated by the terminal device 60 and cannot be operated by the colorimeter 30. Naturally, the notification by sound and the projection to the outside and display on the display included in the colorimeter 30 may be combined.

The colorimeter 30 performs the color measurement in response to the pressing of the color measurement button 40 included in the colorimeter 30. However, the colorimeter 30 may perform the color measurement according to another trigger instead or in addition to the pressing of the color measurement button 40. For example, the colorimeter 30 may perform the color measurement according to an instruction by voice from the user or may perform the color measurement according to an instruction from the terminal device 60. Further, the colorimeter 30 may detect that the colorimeter 30 is pressed against a target object and perform the color measurement. Alternatively, the colorimeter 30 may always repeat the color measurement until a predetermined limit time and, when a color coinciding with a reference color is measured, regard the color as a color measurement target and, when a color coinciding with the reference color is not measured by the limit time, regard a color closest to the reference color among colors measured in the limit time as the color measurement target.

For example, in selecting colors close to the measured color, when there is only one color, a color difference of which from the measured color is smaller than a threshold, only the color may be notified. When there is no color, a color difference of which from the measured color is smaller than the threshold, it may be notified to the user that there is no color close to the measured color without showing an approximate color.

A target of the color measurement is not limited. For example, the color measurement target may be a print, may be dyed cloth, may have a flat shape, or may have a three-dimensionally complicated shape.

What is claimed is:

1. A color measuring system comprising:
a color measurement sensor configured to perform color measurement; and
a processor configured to receive designation of a color sample book,
the processor being configured to, in response to the color measurement being performed, compare colors of the color sample book and a color measured by the color measurement sensor and automatically select colors close to the measured color out of the color sample book,
the processor being configured to notify the selected colors to a user as approximate colors of the measured color,
the processor being configured to select a plurality of colors out of the colors of the color sample book in order from a color closest to the measured color, and
the processor being configured to notify the selected plurality of colors while switching, according to an instruction of the user, a first notification for arranging the selected plurality of colors in at least one line in order from a color closest to the measured color and notifying the selected plurality of colors to the user as the approximate colors and a second notification for arranging the selected plurality of colors on a color space and notifying the selected plurality of colors to the user as the approximate colors.

2. The color measuring system according to claim 1, wherein
the processor performs processing for displaying a selection screen for the color sample book, and
the processor receives designation of the color sample book by the user on the selection screen for the color sample book.

3. The color measuring system according to claim 1, wherein the processor performs processing for displaying color differences between the measured color and the approximate colors along with the approximate colors.

4. The color measuring system according to claim 1, wherein the processor receives a group of a plurality of colors as a user-defined custom color sample book.

5. The color measuring system according to claim 1, wherein
the processor receives designation of a color difference calculation method in performing comparison of the colors of the color sample book and the measured color, and
the processor selects colors close to the measured color out of the color sample book based on a color difference calculated by the calculation method.

6. A non-transitory computer-readable storage medium storing a program for causing a computer, which communicates with a color measurement sensor, to execute:
receiving designation of a color sample book;
in response to color measurement being performed by the color measurement sensor, comparing colors of the color sample book and a color measured by the color measurement sensor and automatically selecting colors close to the measured color out of the color sample book; and
notifying the selected colors to a user as approximate colors of the measured color,
the selecting of the colors including selecting a plurality of colors out of the colors of the color sample book in order from a color closest to the measured color, and
the notifying of the selected colors including notifying the selected plurality of colors while switching, according to an instruction of the user, a first notification for arranging the selected plurality of colors in at least one line in order from a color closest to the measured color and notifying the selected plurality of colors to the user as the approximate colors and a second notification for arranging the selected plurality of colors on a color space and notifying the selected plurality of colors to the user as the approximate colors.

* * * * *